United States Patent [19]

Vershure, Jr.

[11] Patent Number: 4,827,716

[45] Date of Patent: May 9, 1989

[54] DUAL FUNCTION GAS GENERATION SYSTEM FOR ON BOARD INSTALLATION ON TURBINE POWERED AIRCRAFT

[75] Inventor: Roy W. Vershure, Jr., Escondido, Calif.

[73] Assignee: Sundstrand Corporation, Rockford, Ill.

[21] Appl. No.: 133,492

[22] Filed: Dec. 14, 1987

[51] Int. Cl.$^4$ .............................. F02C 3/20; F02C 7/00
[52] U.S. Cl. ............................... 60/39.07; 60/39.142; 60/727
[58] Field of Search ............... 60/39.07, 39.12, 39.142, 60/39.33, 39.461, 727; 55/158; 244/135 R

[56] References Cited

U.S. PATENT DOCUMENTS

| | | | |
|---|---|---|---|
| 2,643,511 | 6/1953 | Briggs | 60/39.142 |
| 3,040,520 | 6/1962 | Rae | 60/39.461 |
| 3,886,733 | 6/1975 | Connell | 60/39.461 |
| 4,681,602 | 7/1987 | Glenn et al. | 55/158 |
| 4,684,081 | 8/1987 | Cronin | 60/39.461 |

Primary Examiner—Louis J. Casaregola
Attorney, Agent, or Firm—Wood, Dalton, Phillips, Mason & Rowe

[57] ABSTRACT

An enriched oxidant for use with an air breathing turbine engine driven power unit 14 in abnormal operating conditions may be obtained from an oxygen enriched air outlet 30 of a conventional inert gas generator 24 employed for providing nitrogen enriched air to "inert" aircraft fuel tanks 12.

7 Claims, 1 Drawing Sheet

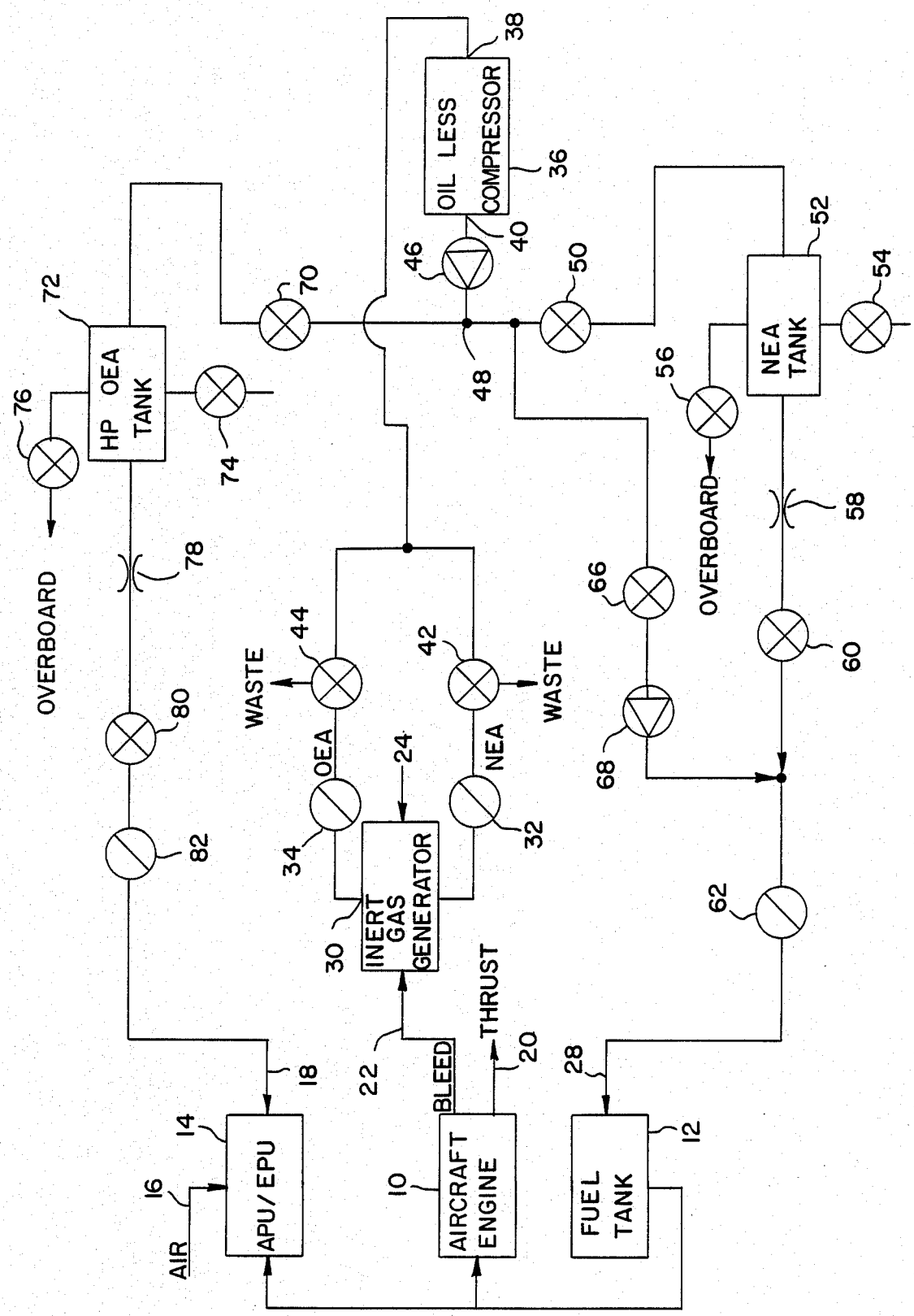

DUAL FUNCTION GAS GENERATION SYSTEM FOR ON BOARD INSTALLATION ON TURBINE POWERED AIRCRAFT

FIELD OF THE INVENTION

This invention relates to a gas generation system for use on aircraft for providing an inert gas stream which may be used to "inert" fuel tanks and an oxygen enriched stream which may be utilized as an oxidant for combination with fuel and driving a power unit on board such aircraft.

BACKGROUND OF THE INVENTION

In so-called fly-by-wire aircraft, which are generally turbine powered aircraft, aircraft control surfaces are not linked to the controls by mechanical means. Rather, the link is via electrical or hydraulic circuits. Consequently, in the event of an electrical or hydraulic failure, the aerodynamic configuration of the aircraft cannot be altered under the control of the pilot until power is restored. As a result, such aircraft require an emergency power unit which is capable of responding to a power failure and providing a sizable quantity of electrical and/or hydraulic energy in very short order so that control of the aircraft can be returned to the pilot.

Fly-by-wire aircraft, like other aircraft of more than basic simplicity, also require an auxiliary power unit for providing electrical and hydraulic energy and bleed air when the main engine or engines of the aircraft are not in use. Quite typically, both an emergency power unit and an auxiliary power unit will each employ a gas turbine engine coupled to a generator and a hydraulic pump.

While in some aircraft, an auxiliary power unit may be easily adapted to serve as an emergency power unit as well, and thereby minimize space requirements as well as weight concerns, the adaptation is not so simple on high performance aircraft that may operate at rather high altitudes. In particular, because a typical auxiliary power unit turbine is an air breathing turbine, at high altitudes, the density of the air will be insufficient to start the turbine and rapidly bring the same up to a speed at which it will operate at that altitude to produce emergency power in an emergency situation.

To meet this and other problems, Friedrich, in his U.S. Pat. No. 4,092,824, issued June 6, 1978, proposes a turbine for use in aircraft for starting purposes as well as for driving auxiliary equipment such as a generator and which is capable of operating in a conventional air breathing mode as well as in an emergency mode that does not require the presence of air. In particular, Friedrich includes a supply of hydrazine on the aircraft. Hydrazine is capable of undergoing an exothermic decomposition reaction and the heat from this reaction is utilized by Friedrich to vaporize aircraft fuel to thereby provide a volume of hot gas which drives the turbine in an emergency situation.

While this solution does solve a number of the previously specified problems, it also creates some new ones. In particular, the decomposition products of hydrazine can accumulate much like soot within the turbine and that will decrease turbine efficiency when operating conventionally. Perhaps more significantly, because the basis of such a system is that of an exothermic decomposition reaction, it necessarily follows that a fuel such as the hydrazine utilized in the system must be sufficiently unstable as to rapidly undergo decomposition. Of course, the presence of a fuel that is not stable in the conventional sense on aircraft presents hazards of its own.

Still another difficulty resides in the fact that hydrazine and proper storage facilities therefor may not be available at all ground service support locations for the aircraft. Thus, the servicing of a system whose hydrazine fuel charge has been particularly or wholly consumed becomes a problem, particularly since hydrazine is toxic and is not easily handled.

To obviate these problems, there have been proposals of a combined auxiliary and emergency power units as well as an integrated power unit which combines the functions of both. See commonly assigned Ser. No. 119,978 filed Nov. 13, 1987, and entitled "Combined Auxiliary and Emergency Power Unit," naming myself and Colin Rodgers and my commonly assigned application Ser. No. 001,818 filed Jan. 8, 1987, entitled "Integrated Power Unit," the details of both of which are herein incorporated by reference.

Accordingly to these proposals, oxygen or oxygen enriched air is utilized as an oxidant for fuel in emergency situations to rapidly bring a turbine up to speed to provide power, even at high altitudes. Because oxygen or oxygen enriched air is utilized, the difficulty in rapidly bringing a turbine up to speed at high altitude is not encountered. Additionally, neither oxygen nor oxygen enriched air are unstable in the sense of hydrazine. Furthermore, both lend themselves to deployment at ground support locations far more readily than hydrazine and thus do not pose the same logistic problems encountered with hydrazine.

Nonetheless, it remains desirable to completely free systems of the type proposed in the foregoing patent applications from logistic problems of any sort, particularly in the case of high performance military aircraft.

The present invention is directed to solving that problem.

SUMMARY OF THE INVENTION

It is the principal object of the invention to provide a dual function gas generating system for on board installation on a turbine powered aircraft which, in addition to conventionally providing inert gas for the "inerting" of fuel tanks, will provide oxygen enriched air that may be employed as the oxidant in an air breathing turbine engine driven power unit during abnormal situations.

An exemplary embodiment of the invention achieves the foregoing object in a system having means, including a compressor, for receiving bleed air from an aircraft turbine engine and separating the same into compressed oxygen enriched air (OEA) and compressed nitrogen enriched air (NEA). First and second storage tanks are provided for OEA and NEA respectively, with at least the first tank being a high pressure tank. Means are provided for connecting the receiving and separating means to the first and second tanks to receive compressed OEA and NEA respectively. First means are provided for connecting the first tank to an auxiliary and/or emergency power unit so that OEA may serve as an oxidant for fuel therein when air alone will not reliably support combustion and second means are provided for connecting the second tank to an aircraft fuel tank to provide NEA thereto to "inert" the aircraft fuel tank.

In a preferred embodiment of the invention, the receiving and separating means comprises a separator that separates bleed air from a turbine engine into OEA and NEA and means for directing OEA and NEA from the separator to the compressor to be compressed thereby after separation by the separator.

The invention contemplates that the separator have an OEA outlet and and NEA outlet and that the directing means includes valve means for selectively connecting the OEA outlet or the NEA outlet to the compressor.

In a highly preferred embodiment of the invention, there is provided an inert gas generator having an inlet for air, a means for separating air received from the inlet into NEA and OEA, an NEA outlet and an OEA outlet. A compressor is provided and has an inlet and an outlet. First valves are included for connecting one or the other of the NEA outlet and the OEA outlet to the compressor inlet.

The system further includes an NEA storage tank along with a high pressure OEA storage tank. Second valves are utilized for connecting the compressor outlet to one or the other of the NEA storage tanks or the high pressure OEA storage tank. First and second pressure relief means are respectively associated with the NEA storage tank and the high pressure OEA storage tank and a third valve is utilized for connecting the NEA storage tank to a fuel tank so that the fuel tank may be inerted with NEA. A fourth valve is utilized for connecting the high pressure OEA tank to an air breathing turbine engine driven power unit to provide the same with OEA as an enriched oxidant in an abnormal operational system.

Other objects and advantages will become apparent from the following specification taken in connection with the accompanying drawings.

DESCRIPTION OF THE DRAWINGS

The FIGURE is a schematic of a dual function gas generation system for on board installation on a turbine powered aircraft and made according to the invention.

DESCRIPTION OF THE PREFERRED EMBODIMENT

An exemplary embodiment of a dual function gas generation system made according to the invention is intended for on board installation on a turbine powered aircraft having at least one turbine engine such as schematically illustrated at 10 in the FIGURE. The aircraft will also have at least one fuel tank 12 for providing fuel to the aircraft engine as well as to an air breathing turbine engine driven power unit 14. The power unit 14 may be of any desired type and may include a combined auxiliary power unit/emergency power unit or integrated unit such as those disclosed in the previously identified, commonly assigned applications. In the usual case, the power unit 14 will receive air from an intake 16 and which serves as the oxidant for fuel from the fuel tank 12 under normal circumstances. However, in emergency situations, whereat the turbine forming part of the power unit 14 must be brought up to speed rapidly and reliably, the power unit 14 is adapted to receive an enriched oxidant such as oxygen or oxygen enriched air, that will reliably support rapid combustion. The enriched oxidant may be received on an intake 18.

The aircraft engine includes provision for the utilization of thrust as generally illustrated at 20. As is well known, the thrust may be produced by turbine exhaust gas or by a propeller coupled to the turbine in a conventional fashion. In addition, the aircraft engine 10 includes provision for the output of bleed air along a line 22 for conventional purposes.

The aircraft may also include a so-called inert gas generator, generally designated 24, of conventional construction. As is well known, such a generator will typically have an outlet 26 for nitrogen enriched air (NEA). The nitrogen enriched air has an oxygen content well below the usual 21% and thus will not support combustion. It is pumped into fuel tanks, such as the fuel tank 12, along a line 28 as fuel is being drained from the tank 12 to fuel the engine 10 and/or the power unit 14. In this way, a combustion supporting mixture of oxidant and fuel vapor cannot exist within the tank 12 since it is displaced by NEA; and any fire hazard associated therewith is eliminated.

As the inert gas generator 24 operates to produce nitrogen enriched air at the outlet 26, it also produces oxygen enriched air at an outlet 30. Conventionally, the OEA is a waste product which is discharged from the aircraft. However, according to the present invention, the OEA from the outlet 26 may be provided to the power unit 14 along the line 18 as an enriched oxidant that may be used to oxidize fuel in the unit 14 in abnormal (i.e., emergency) situations.

A back pressure control valve 32 is coupled to the NEA outlet 26. A similar back pressure control valve 34 is connected to the OEA outlet 30.

The system also includes an oilless compressor 36 having an inlet 38 and an outlet 40. The inlet 38 may be connected to the NEA outlet 26 via a valve 42 or to the OEA outlet 30 by a valve 44. Typically, though not necessarily, the valves 42 and 44 may be mechanically or electrically coupled such that when the valve 42 is configured to provide NEA to the inlet 30, the valve 44 will be configured to discharge OEA from the outlet 3 overboard. Conversely, when the valve 44 is configured to provide OEA to the compressor inlet 38, the valve 42 would then be discharging NEA overboard.

In any event, the valves 42 and 44 are selectively operable to provide NEA or OEA to the compressor inlet 38 as desired.

As a consequence, either compressed NEA or compressed OEA will be discharged from the compressor outlet 40. From the outlet 40, the compressed gas passes through a check valve 46 to a tee 48. One side of the tee 48 is connected via a control valve 50 to a storage tank 52 for NEA. Also associated with the NEA tank 52 is a ground service valve 54 through which the tank 52 may be charged or discharged as desired. A pressure relief valve 56 is also associated with the tank 54 for discharging gas overboard if the preset pressure limits are exceeded.

The NEA tank 52 is also connected via a flow limiter 58 such as an orifice or the like and a control valve 60 to the inert gas inlet 28 for the fuel tank 12 via a suitable regulator 62.

Also contemplated is a bypass line 64 that interconnects the tee 48 and the junction of the control valve 60 and the regulator 62. The bypass line 64 includes a control valve 66 as well as a check valve 68 and may be operated to direct compressed NEA directly from the compressor 36 to the fuel tank 12.

The tee 48 is also connected via a valve 70 to a high pressure OEA storage tank 72. Like the tank 52, the high pressure OEA storage tank 72 includes a ground service valve 74 as well as a pressure relief valve 76. A flow limiter 78, a control valve 80 and a regulator 82 connect the tank 72 to the enriched oxidant intake 18 with the consequence that oxygen enriched air from the tank 72 may be provided to the power unit 14 by opening of the valve 80. Suitable controls and/or interlocks which may be mechanical and/or electrical may be employed to assure that when the valve 42 is configured to provide NEA to the compressor inlet 38, the valve 70 will be closed. Similarly, the same means may be utilized to assure that when the valve 44 is providing OEA to the compressor 36, both of the valves 50 and 66 will be closed.

Through the use of the tanks 52 and 72, NEA and OEA may be compressed as desired in accordance with demand requirements and stored for use when needed. As a result, even if the system is providing NEA for inerting fuel tanks, should an abnormal operating situation arise, OEA for operation of the power unit 14 will still be available from the quantity of OEA stored at high pressure within the tank 72. The converse is, of course, true with respect to NEA.

It will also be appreciated that a system made according to the invention eliminates ground based logistic problems involving the storage of oxygen or oxygen enriched air by making use of the heretofore wasted oxygen enriched air stream emanating from the generator 24 as it produces NEA for inerting fuel tanks.

I claim:

1. A dual function gas generation system for on board installation on turbine powered aircraft having fuel tanks and an auxiliary and/or emergency power unit and comprising:
   means for receiving bleed air from an aircraft turbine engine and separating the same into oxygen enriched air (OEA) and nitrogen enriched air (NEA);
   a compressor;
   means for selectively directing OEA or NEA from said receiving and separating means to said compressor;
   first and second storage tanks for OEA and NEA respectively, at least said first tank being a high pressure tank;
   means for selectively connecting said compressor to said first or said second tanks so as to receive compressed OEA or NEA respectively;
   first means for connecting said first tank to an auxiliary and/or emergency power unit so that OEA may serve as an oxidant for fuel therein when air alone will not reliably support combustion; and
   second means for connecting said second tank to an aircraft fuel tank to provide NEA thereto to thereby "inert" the aircraft fuel tank.

2. The dual function gas generator system of claim 1 further including a selectively operable bypass for said second tank so that compressed NEA from said compressor may flow directly to said second connecting means.

3. A dual function gas generation system for on board installation on turbine powered aircraft having fuel tanks and an auxiliary and/or emergency power unit and comprising:
   means, including a compressor, for receiving bleed air from an aircraft turbine engine and separating the same into compressed oxygen enriched air (OEA) and compressed nitrogen enriched air (NEA);
   first and second storage tanks for OEA and NEA respectively, at least said first tank being a high pressure tank;
   means for connecting said receiving and separating means to said first and said second tanks to receive compressed OEA or NEA respectively;
   first means for connecting said first tank to an auxiliary and/or emergency power unit so that OEA may serve as an oxidant for fuel therein when air alone will not reliably support combustion; and
   second means for connecting said second tank to an aircraft fuel tank to provide NEA thereto to thereby "inert" the aircraft fuel tank.

4. The dual function gas generator of claim 3 wherein said receiving and separating means comprises a separator that separates bleed air into OEA and NEA and means for directing OEA and NEA from said separator to said compressor to be compressed thereby after separation by said separator.

5. The dual function gas generator of claim 4 wherein said separator has an OEA outlet and an NEA outlet and said directing includes valve means for selectively connecting said OEA outlet or said NEA outlet to said compressor.

6. A dual function gas generating system for use in an aircraft having a turbine engine and a normally air breathing turbine engine driven power unit adapted for use with an enriched oxidant in abnormal operation and situations, and fuel tanks for holding fuel for said turbine engine and comprising:
   an inert gas generator having an inlet for air, a means for separating air from said inlet into a nitrogen enriched air (NEA) and oxygen enriched air (OEA), an NEA outlet and an OEA outlet;
   a compressor having an inlet and an outlet;
   first valves for connecting one or the other of said NEA outlet and said OEA outlet to said compressor inlet;
   an NEA storage tank;
   a high pressure OEA tank;
   second valves for connecting said compressor outlet to one or the other of said NEA storage tank and said high pressure OEA tank;
   first and second pressure relief means respectively for said NEA storage tank and said high pressure OEA tank;
   a third valve for connecting said NEA storage tank to a fuel tank so that the fuel tank may be "inerted" with NEA; and
   a fourth valve for connecting said high pressure OEA tank to an air breathing turbine engine driven power unit to provide the same with OEA as an enriched oxidant in an abnormal operational system.

7. An aircraft including an air breathing turbine engine driven power unit including an enriched oxidant inlet in combination with the system of claim 6, said inlet being connected to said fourth valve.

* * * * *